(12) United States Patent
Ghiasi et al.

(10) Patent No.: US 9,008,127 B2
(45) Date of Patent: *Apr. 14, 2015

(54) METHOD AND SYSTEM FOR SPEED NEGOTIATION FOR TWISTED PAIR LINKS IN FIBRE CHANNEL SYSTEMS

(71) Applicant: Broadcom Corporation, Irvine, CA (US)

(72) Inventors: Ali Ghiasi, Cupertino, CA (US); Kevin Brown, Long Beach, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/063,063

(22) Filed: Oct. 25, 2013

(65) Prior Publication Data

US 2014/0056315 A1    Feb. 27, 2014

Related U.S. Application Data

(63) Continuation of application No. 11/491,629, filed on Jul. 24, 2006, now Pat. No. 8,571,070.

(60) Provisional application No. 60/741,789, filed on Dec. 2, 2005.

(51) Int. Cl.

| H04J 1/14 | (2006.01) |
|---|---|
| H04J 3/06 | (2006.01) |
| H04J 3/12 | (2006.01) |
| H04L 5/14 | (2006.01) |
| H04L 12/935 | (2013.01) |
| H04L 29/06 | (2006.01) |
| H04L 29/08 | (2006.01) |
| H04L 12/931 | (2013.01) |

(52) U.S. Cl.
CPC ............. *H04L 5/1446* (2013.01); *H04L 69/324* (2013.01); *H04L 49/3054* (2013.01); *H04L 29/06537* (2013.01); *H04L 49/357* (2013.01); *H04L 69/24* (2013.01); *H04L 69/323* (2013.01)

(58) Field of Classification Search
None
See application file for complete search history.

(56) References Cited

U.S. PATENT DOCUMENTS

| 7,032,139 B1 | 4/2006 | Iryami et al. |
|---|---|---|
| 7,079,717 B2 | 7/2006 | Liu et al. |
| 7,173,942 B1 * | 2/2007 | Sutardja et al. ............... 370/463 |

(Continued)

OTHER PUBLICATIONS

Micrel Inc. "Application Note 123. PHY Speed and Duplex Configuration. Micrel 10/100 Switches/PHYs." Oct. 2004.*

*Primary Examiner* — Faruk Hamza
*Assistant Examiner* — Andrew Oh
(74) *Attorney, Agent, or Firm* — Oblon, McClelland, Maier & Neustadt, L.L.P.

(57) ABSTRACT

Certain aspects of a method and system for speed negotiation for twisted pair links in fiber channel systems are disclosed. Aspects of a method may include communicating data between fiber channel host devices communicatively coupled via a twisted pair link based on a common speed negotiated between the fiber channel host devices. At least one available speed may be determined for the communication of data between the fiber channel host devices over the twisted pair link. The determined available speeds for each of the fiber channel host devices may be exchanged via at least one fast link pulse signal. The common speed negotiated may be a highest available speed for the communication of data between the fiber channel host devices.

20 Claims, 6 Drawing Sheets

(56) References Cited

U.S. PATENT DOCUMENTS

| | | | |
|---|---|---|---|
| 7,406,545 B1 | 7/2008 | Rothberg et al. | |
| 7,561,529 B2 | 7/2009 | Lucas et al. | |
| 7,599,392 B2 | 10/2009 | Holt et al. | |
| 7,684,477 B1 * | 3/2010 | Vijayaraghavan et al. | 375/225 |
| 7,765,343 B2 | 7/2010 | Chen et al. | |
| 8,571,070 B2 * | 10/2013 | Ghiasi et al. | 370/507 |
| 2002/0041643 A1 | 4/2002 | Tzannes et al. | |
| 2002/0142676 A1 | 10/2002 | Hosaka et al. | |
| 2003/0088796 A1 | 5/2003 | Abdulkarim | |
| 2003/0212312 A1 | 11/2003 | Coffin, IV et al. | |
| 2004/0057660 A1 | 3/2004 | Jablonski | |
| 2004/0062245 A1 * | 4/2004 | Sharp et al. | 370/392 |
| 2004/0197058 A1 | 10/2004 | Eichelberger et al. | |
| 2004/0216914 A1 | 11/2004 | Vexler et al. | |
| 2004/0236906 A1 | 11/2004 | Matsushige et al. | |
| 2004/0243666 A1 | 12/2004 | Wood | |
| 2005/0008041 A1 | 1/2005 | Wu et al. | |
| 2005/0055456 A1 | 3/2005 | Chalupsky et al. | |
| 2005/0132258 A1 * | 6/2005 | Chen et al. | 714/704 |
| 2005/0163457 A1 | 7/2005 | Liu et al. | |
| 2005/0196119 A1 * | 9/2005 | Popovic et al. | 385/134 |
| 2006/0056844 A1 | 3/2006 | Goodwin et al. | |
| 2006/0082868 A1 | 4/2006 | Yamashita | |
| 2006/0153179 A1 | 7/2006 | Ho et al. | |
| 2006/0273819 A1 | 12/2006 | Opperman et al. | |
| 2007/0064492 A1 | 3/2007 | Lucas et al. | |
| 2007/0116038 A1 | 5/2007 | Holt et al. | |
| 2007/0116055 A1 | 5/2007 | Atsumi et al. | |
| 2007/0173202 A1 | 7/2007 | Binder et al. | |
| 2007/0274351 A1 * | 11/2007 | Theodoras | 370/537 |

* cited by examiner

METHOD AND SYSTEM FOR SPEED NEGOTIATION FOR TWISTED PAIR LINKS IN FIBRE CHANNEL SYSTEMS

CROSS-REFERENCE TO RELATED APPLICATIONS/INCORPORATION BY REFERENCE

This patent application is a continuation of U.S. patent application Ser. No. 11/491,629 filed Jul. 24, 2013, which is hereby incorporated herein by reference in its entirety and which makes reference to, claims priority to, and claims the benefit of U.S. Provisional Patent Application Ser. No. 60/741,789 filed Dec. 2, 2005.

This application also makes reference to U.S. application Ser. No. 11/491,628 filed on Jul. 24, 2013.

The above stated application is hereby incorporated herein by reference in its entirety.

FIELD OF THE INVENTION

Certain embodiments of the invention relate to wired communication systems. More specifically, certain embodiments of the invention relate to a method and system for speed negotiation for twisted pair links in fibre channel systems.

BACKGROUND OF THE INVENTION

Fibre channel provides an interconnect technology, which is generally utilized for high-performance computer peripherals and networks, that has a number of advantages over similar technologies. Fibre channel enables channel data transfer speeds about two and half times faster than high-end small computer system interface (SCSI) and carries network and channel traffic over the same lines with equal efficiency. Fibre channel may also support the transport of audio and/or video data over a wide range of transmission media and distances, is very reliable, scalable, and easy to integrate into existing systems.

Fibre channel is a communications protocol that enables transmission of data at speeds from approximately 1.0625 Gbps up through 8.5 Gbps. Historically, fibre channel has operated over optical fibre cables, coaxial or twin-axial copper cabling, or as a chip-to-chip interface within a board. In conventional fibre channel systems, electrical media was used to communicate fibre channel signals. High speed fiber optic systems may be used in various communication applications, for instance in telecommunication over long transmission distances. A telecommunication network may be classified into various levels such as subscriber networks, regional networks and national networks. The national networks, for example, may exist between different cities where there is a greater demand for higher transmission speeds, for example, above 5 Gbits/sec. Optical dispersion is a fundamental problem for high-speed gigabit networks and is of particular importance as bit rates exceed 2.4 Gbits/sec, for example. In national networks, for example, dispersion may limit the transmission speeds between transmitters and receivers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for speed negotiation for twisted pair links in fibre channel systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for speed negotiation for twisted pair links in fibre channel systems. Certain aspects of the invention may provide a method and system for communicating data between fibre channel host devices communicatively coupled via a twisted pair link based on a common speed negotiated between the fibre channel host devices. At least one available speed may be determined for the communication of data between the fibre channel host devices over the twisted pair link. The determined available speeds for the communication of data between the fibre channel host devices over the twisted pair link may be stored. The determined available speeds for each of the fibre channel host devices may be exchanged via at least one fast link pulse signal. The negotiated common speed may be communicated to each of the fibre channel host devices after the common speed is negotiated between the fibre channel host devices. The common speed negotiated may be a highest available speed for the communication of data between the fibre channel host devices.

In contrast to fibre channel, Ethernet has historically supported operation over 0-100 meters of twisted pair cable. A typical configuration of the cable is four twisted pairs, in various performance levels, for example, category 5, category 5e, or category 6. Various physical layer solutions have applied sophisticated signal processing algorithms to make use of the channel capacity of the twisted pair cable. Twisted pair cable offers several distinct advantages over the cables historically supported by fibre channel. These include low cost, ease of termination, and availability of field termination.

Both fibre channel and Ethernet have algorithms to allow two nodes, one on each end of a cable, to negotiate between the various speeds to determine the best speed for operation. However, the algorithms used in fibre channel are not directly applicable to many physical architectures that are suitable for operation over twisted pair. One embodiment of the invention provides a new speed negotiation algorithm that may be utilized by fibre channel nodes, which may be directly coupled via twisted pair cables.

Figure 1:
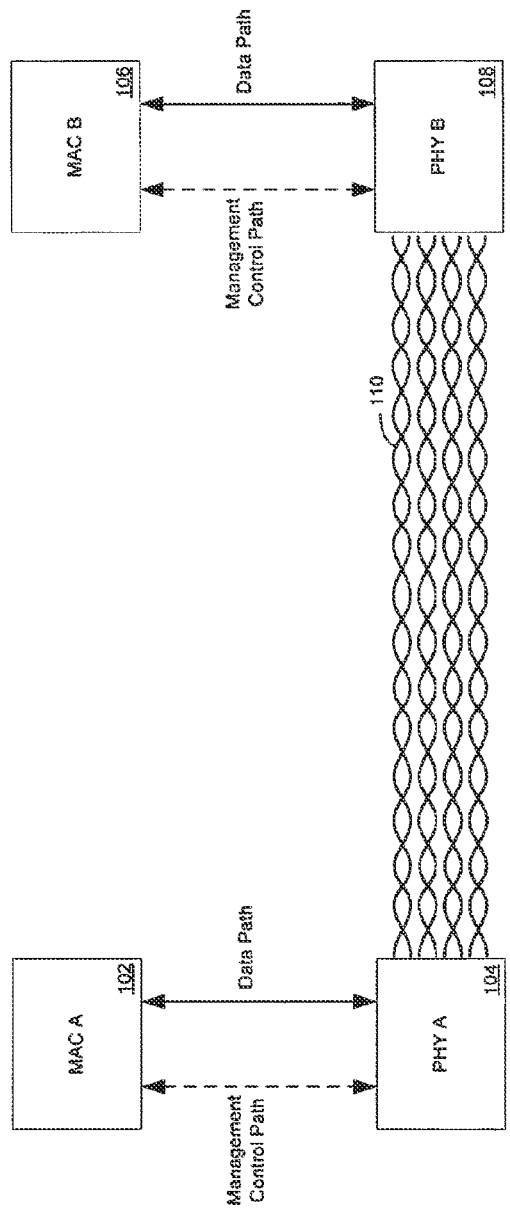
FIG. 1 is a block diagram of an exemplary Ethernet system, which may be utilized in connection with an embodiment of the invention.

FIG. 1 is a block diagram of an exemplary Ethernet system, which may be utilized in connection with an embodiment of the invention. Referring to FIG. 1, there is shown a medium access control (MAC) layer block for node A 102, a physical (PHY) layer block for node A 104, a MAC layer block for node B 106, a PHY layer block for node B 108, and a twisted pair cable 110.

The MAC layers 102 and 106 may comprise suitable logic, circuitry and/or code that may enable encoding and decoding of data packets into bits. The MAC layers 102 and 106 may comprise a MAC address that is unique to each network interface controller (NIC). The MAC layers 102 and 106 may enable furnishing of transmission protocol knowledge and may handle errors in the physical layer, flow control and frame synchronization. The MAC layers 102 and 106 may control how a computer on the network gains access to the data. The physical layer (PHY) A 104 and the PHY layer B 108 may enable transmission of information over a physical medium connecting two devices. The PHY layers 104 and 108 may transmit a bit stream, for example, an electrical impulse, light or radio signal through the network at the electrical and mechanical level. The PHY layers 104 and 108 provide the hardware for sending and receiving data on a carrier, for example, twisted pair cables 110.

In an Ethernet system utilizing twisted pair cables, speed matching may be achieved through the IEEE 802.3 auto-negotiation (AN) mechanism. In an Ethernet system with two nodes A and B, each node has a MAC layer 102 and 106, which communicates with a corresponding PHY layer 104 and 108 respectively. The PHY layers A and B, 104 and 108 respectively, communicate with each other over the twisted pair cable 110. There is a data path between the MAC layer and the PHY layer, for example, between MAC layer A 102 and PHY layer A 104 for communicating Ethernet data packets. There is also a lower speed management control path, management data input/output (MDIO) to monitor and control the PHY layer, for example, between MAC layer B 106 and PHY layer B 108.

During a data transmission, the two PHY layers 104 and 108 at the end of each twisted pair cable 110 always operate at the same speed. For higher speed Ethernet technology at 1 Gbps or more, for example, 1000BASE-T, or 10GBASE-T, both the PHY layers 104 and 108 on both ends of the cable 110 operate at the same frequency because the data is transmitted and received in both directions on all four pairs simultaneously, and each PHY layer, 104 or 108, has to cancel its transmitted signal while receiving data. Therefore, the transmit and receive functions are tightly coupled, and operate together synchronously. Accordingly, the two PHY layers, 104 and 108 have to establish a common speed before any high speed data transmission may occur.

The common speed between the two PHY layers, 104 and 108 may be negotiated when communication is first initiated between the two. Each MAC layer, 102 and 106 may determine the capabilities of its corresponding PHY layer, 104 and 108 respectively, by polling the PHY layer through the MDIO. Each MAC layer, 102 and 106 may decide on a particular available speed to operate based on higher-level system considerations. Each MAC layer, 102 and 106 may direct, through MDIO, the corresponding PHY layer, 104 and 108, respectively, the particular speed it might utilize to transmit data. The PHY layers, 104 and 108 may exchange their respective speeds through a low speed communications protocol known as fast link pulses. Each PHY layer, 104 and 108, may compare its own speed to that of its link partner, and selects the highest common speed. The PHY layers, 104 and 108 may establish a data communication link at this highest common speed, and begin transmitting IDLE signals. Each PHY layer, 104 and 108 may communicate the results of negotiation to its corresponding MAC layer, 102 and 106 respectively. Each MAC layer, 102 and 106 may then begin transmitting packets as needed at the negotiated speed.

The Ethernet MAC needs to wait until negotiation is complete before transmitting data at full speed. The 802.3 negotiation process may take several seconds, which is very long compared with most events in high-speed communications systems like Ethernet or fibre channel. Furthermore, this negotiation process also requires that the two PHY layers, 104 and 108 each fully complete the negotiation process before beginning transmission of either data or IDLE signals at the final operating speed.

Figure 2:
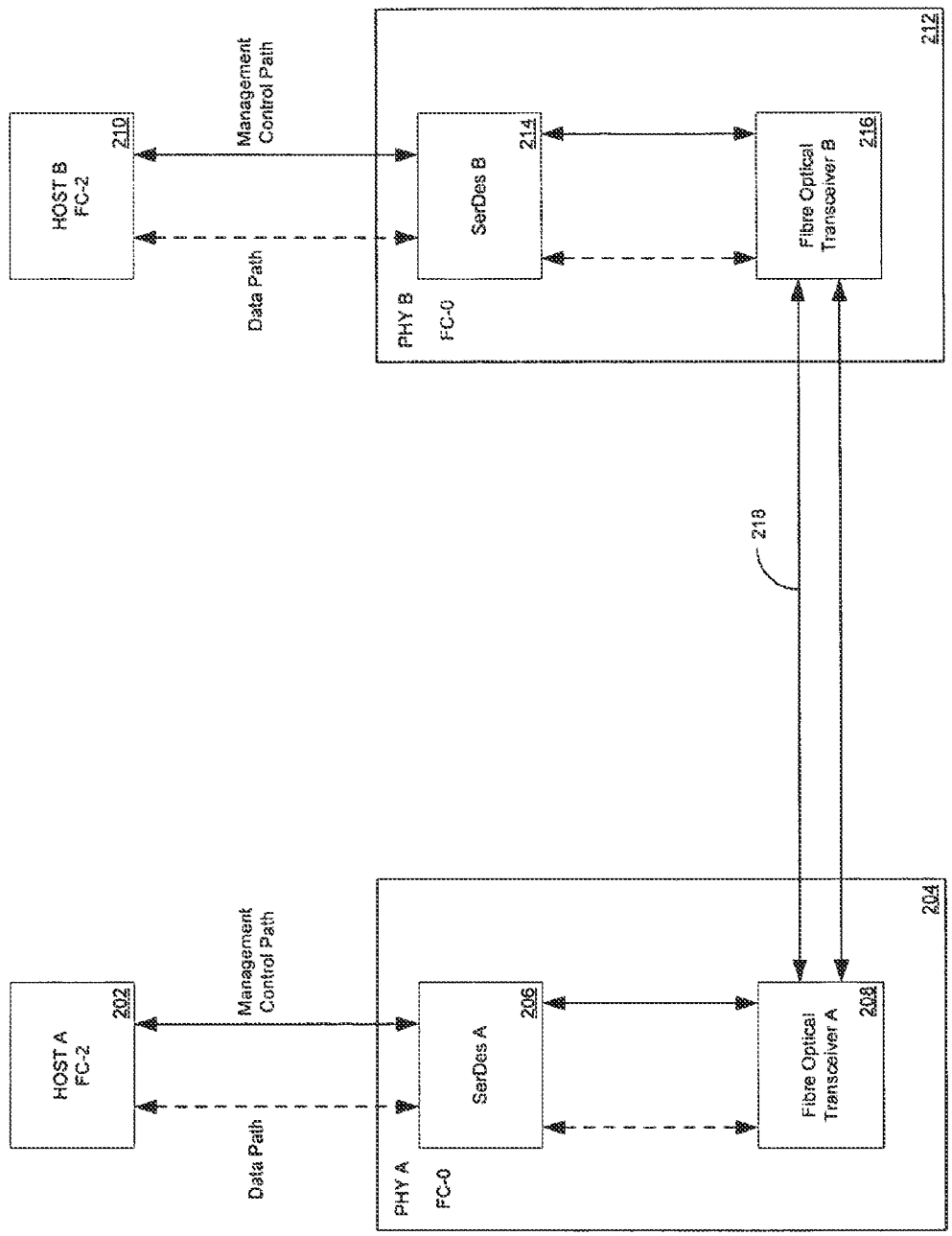
FIG. 2 is a block diagram of an exemplary fibre channel system, which may be utilized in connection with an embodiment of the invention.

FIG. 2 is a block diagram of an exemplary fibre channel system, which may be utilized in connection with an embodiment of the invention. Referring to FIG. 2, there is shown a host A 202, a PHY layer block for node A 204, a host B 210, a PHY layer block for node B 212, and an optical fibre cable 218.

The host A 202 and host B 210 may comprise suitable logic, circuitry and/or code that may enable controlling access to a medium that may be shared between two or more entities also known as a data link layer or FC-2 layer analogous to the MAC layer in an Ethernet system. The physical layer (PHY) A 204 and the PHY layer B 212 may enable transmission of information over a physical medium connecting two devices. The PHY layers 204 and 212 may transmit a bit stream, for example, an electrical impulse, light or radio signal through the network at the electrical and mechanical level. The PHY layers 204 and 212 provide the hardware for sending and receiving data over a medium, for example, optical fibre cables 218. The PHY layer A 204 may comprise a serializer-deserializer (SerDes) A block 206 and a fibre optical transceiver A 208. The PHY layer B 212 may comprise a SerDes B block 214 and a fibre optical transceiver B 216.

The SerDes A 206 and SerDes B 214 may comprise suitable logic, circuitry and/or code that may enable conversion of a parallel data stream from FC-1 to a serial data stream and vice versa. The SerDes A 206 and SerDes B 214 may pass the serial data to an optical transceiver A 208 and an optical transceiver B 216 respectively, which converts the electrical signal to light for transmission over the two-channel optical fibre cable 218. The optical transceiver A 208 and an optical transceiver B 216 may receive and convert the optical signals back to electrical signals and pass the electrical signals to SerDes A 206 and SerDes B 214 respectively. The optical signal may be transmitted and received over two separate strands of optical fiber, and the transmit and receive signals are independent.

Figure 3:
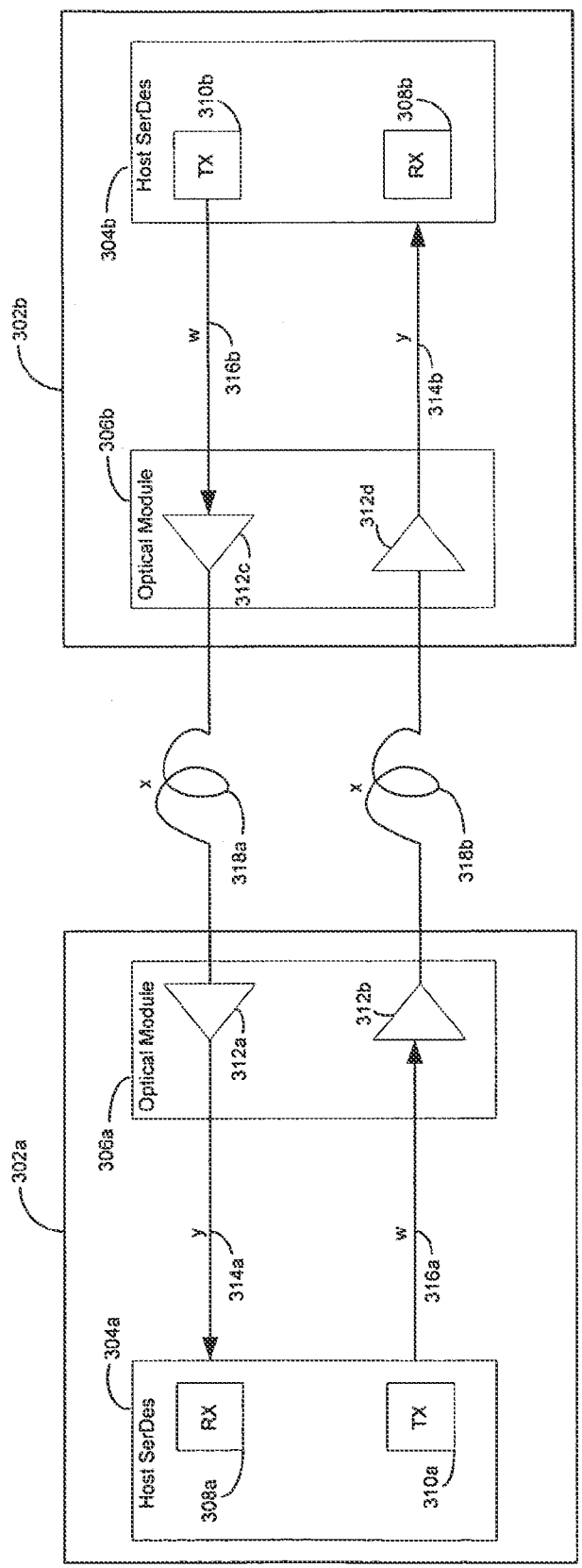
FIG. 3 is a block diagram illustrating electrical channel equalization in an optical communication circuit, in accordance with an embodiment of the invention.

FIG. 3 is a block diagram illustrating electrical channel equalization in an optical communication circuit, in accordance with an embodiment of the invention. Referring to FIG. 3, there is shown a plurality of host boards 302a and 302b, a forward optical path x 318a and a reverse optical path x 318b. The host board 302a comprises a host serializer-deserializer (SerDes) 304a, an optical module 306a, a forward electrical transmit path w 316a and a reverse electrical receive path y 314a. The host board 302 may be coated with a trace material, for example, 8"-12" FR4 trace material. The host SerDes 304a comprises a receiver RX 308a and a transmitter TX 310a. The optical module 306a comprises a plurality of optical amplifiers 312a and 312b. The host board 302b comprises a host SerDes 304b, an optical module 306b, a reverse electrical transmit path w 316b and a forward electrical receive path y 314b. The host SerDes 304b comprises a receiver RX 308b and a transmitter TX 310b. The optical module 306a comprises a plurality of optical amplifiers 312c and 312d.

The forward optical communication link comprises the transmitter TX 310a in the host SerDes 304a, the forward electrical transmit path w 316a, the optical amplifier 312b in the optical module 306a, the forward optical path x 318b, the optical amplifier 312d in the optical module 306b, the forward electrical receive path y 314b and the receiver RX 308b in the host SerDes 304b. The plurality of optical modules 306a and 306b may be either fixed or pluggable modules. When the optical module 306a or 306b is inserted, a nonlinear element may be introduced in the link. The nonlinear element may not be compensated for by using only a receive equalizer. The link may be divided into three segments. For example, the transmit electrical channel may comprise the transmitter TX 310a in the host SerDes 304a and the forward electrical transmit path w 316a. The optical channel may comprise the optical amplifier 312b in the optical module 306a, the forward optical path x 318b and the optical amplifier 312d in the optical module 306b. The receive electrical channel may comprise the forward electrical receive path y 314b and the receiver RX 308b in the host SerDes 304b. The transmitter TX 310a in the host SerDes 304a and the transmitter TX 310b in the host SerDes 304b may enable compensation for dispersion loss by pre-emphasis. The receiver RX 308a in the host SerDes 304a and the receiver RX 308b in the host SerDes 304b may enable compensation for dispersion loss by equalization. The reverse optical communication link comprises the transmitter TX 310b in the host SerDes 304b, the reverse electrical transmit path w 316b, the optical amplifier 312c in the optical module 306b, the reverse optical path x 318a, the optical amplifier 312a in the optical module 306a, the reverse electrical receive path y 314a and the receiver RX 308a in the host SerDes 304a.

The host SerDes 304a and/or 304b may enable calculation of the applied pre-emphasis by categorizing the dispersion loss along at least one of the first electrical path, for example, the forward electrical transmit path w 316a and the first optical path, for example, the forward optical path x 318b. The host SerDes 304a may enable optimization of the applied pre-emphasis by looping back the first electrical path, for example, the forward electrical transmit path w 316a through the optical module 306a. The first electrical path, for example, the forward electrical transmit path w 316a may be looped back to the host SerDes 304a via the reverse electrical receive path y 314a, if the dispersion loss along the first electrical path, for example, the forward electrical transmit path w 316a is similar to the dispersion loss along the second electrical path, for example, the forward electrical receive path y 314b. The host SerDes 304a may enable optimization of the applied pre-emphasis based on monitoring a channel inter-symbol interference (ISI) along at least one of the first electrical path, for example, the forward electrical transmit path w 316a and the second electrical path, for example, the forward electrical receive path y 314b. The host SerDes 304a may be adapted to optimize the applied pre-emphasis by receiving the monitored channel ISI.

Figure 4:
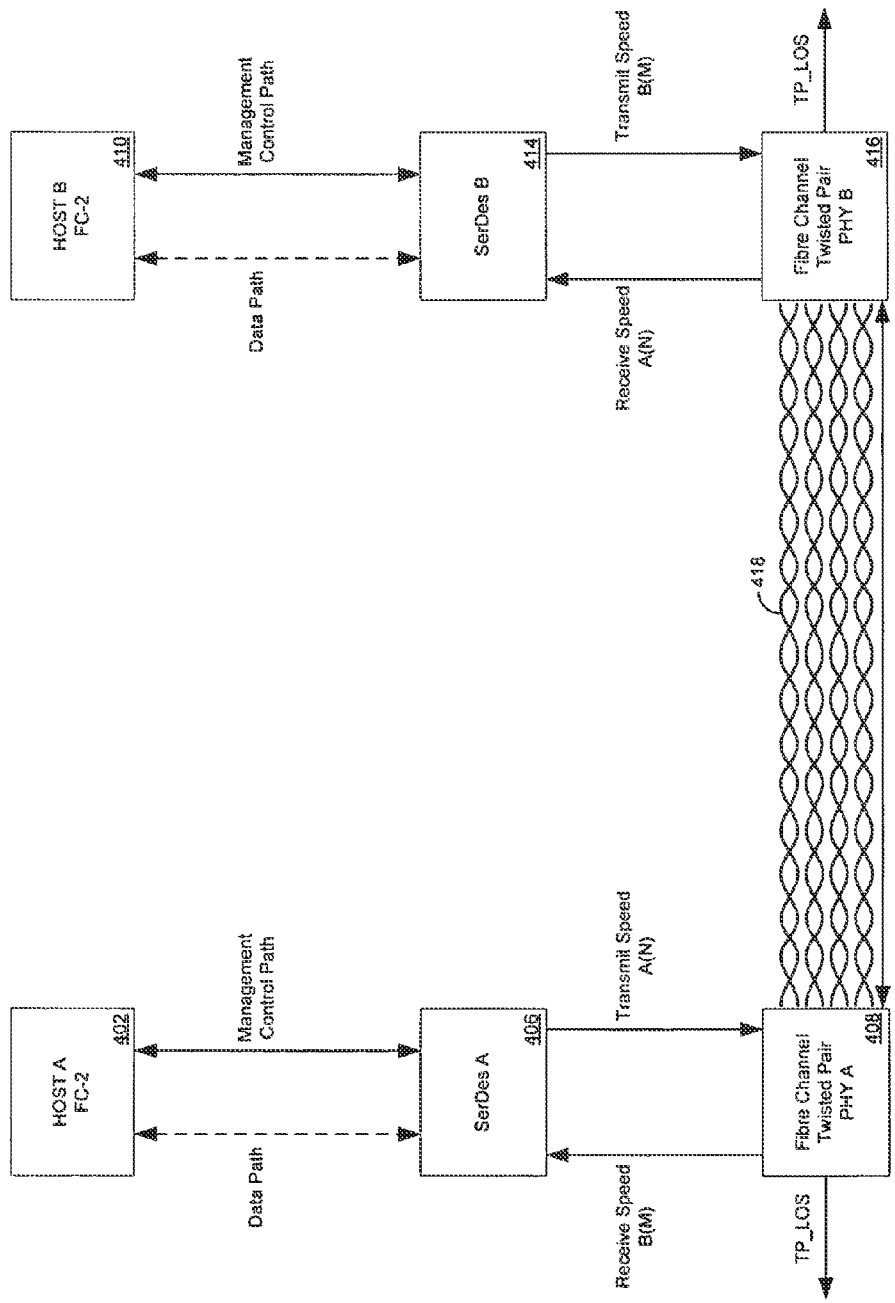
FIG. 4 is a block diagram illustrating a fibre channel over twisted pair system, in accordance with an embodiment of the invention.

FIG. 4 is a block diagram illustrating a fibre channel over twisted pair system, in accordance with an embodiment of the invention. Referring to FIG. 4, there is shown a host A 402, a SerDes A 406, a fibre channel twisted pair PHY layer A 408, a host B 410, a SerDes B 414, a fibre channel twisted pair PHY layer B 416, and a twisted pair cable 418.

The host A 402 and host B 410 may comprise suitable logic, circuitry and/or code that may enable controlling access to a medium that may be shared between two or more entities also known as a data link layer or FC-2 layer analogous to the MAC layer in an Ethernet system. The fibre channel twisted pair PHY layer A 408 and fibre channel twisted pair PHY layer B 416 may enable transmission of information over a physical medium connecting two devices. The fibre channel twisted pair PHY layers 408 and 416 may transmit a bit stream, for example, an electrical impulse, light or radio signal through the network. The fibre channel twisted pair PHY layers 204 and 212 provide the hardware for sending and receiving data on a carrier, for example, twisted pair cables 418.

The SerDes A 406 and SerDes B 414 may comprise suitable logic, circuitry and/or code that may enable conversion of a parallel data stream from FC-2 to a serial data stream and vice versa. The SerDes A 406 and SerDes B 414 may pass the serial data to the fibre channel link 418 comprising of copper or optical cable.

In a fibre channel system, speed negotiation is defined by FC-framing and signaling (FS), as each node A and B is powered up, the FC-2 layer or host A 402 and host B 410 begin sending IDLE signals at their highest speed capabilities. These signals pass through SerDes A 406 and SerDes B 414 respectively, and fibre channel link 418 comprising of copper or optical cable. In the mean time, the FC TP PHY 408 at node A and FC TP PHY 416 at node B may determine their speed capabilities and agree to a common data rate by utilizing the FC-FS auto-negotiation mechanism. When the FC host 402 and 410 are trained, each FC host may start transmitting FC IDLE signals indicating that the link is ready for data transmission. If the FC-2 layer or host A 402 and host B 410 does not receive IDLE signals at the same speed within its timer window, then the corresponding node, A or B will drop its speed to the next lower available speed and continues this process until both nodes A and B converge to a common speed.

In an exemplary embodiment of the invention, assuming host A 402 is capable of transmitting at a lower baud rate than host B 410. The host B 410 FC-2 layer may receive signals back from host A 402 while transmitting at a higher baud rate. The host B 410 may determine the received signal's speed. The host A 402 then matches its transmit speed to its received speed and stops searching. The host B 410 FC-2 layer would simultaneously have received the same speed signals from the host A 402 FC-2 layer, and stops searching. Both nodes A and B are then capable of transmitting fibre channel data packets.

In an exemplary embodiment of the invention the fibre channel twisted pair PHY layer A 408 and fibre channel twisted pair PHY layer B 416 respectively pass any signals from the host A 402 FC-2 layer and the host B 410 FC-2 layer respectively, onto the twisted pair cable 418. In another embodiment of the invention, the fibre channel twisted pair PHY layer A 408 and fibre channel twisted pair PHY layer B 416 may operate at a fixed speed supported by both host A 402 and host B 410.

Figure 5:
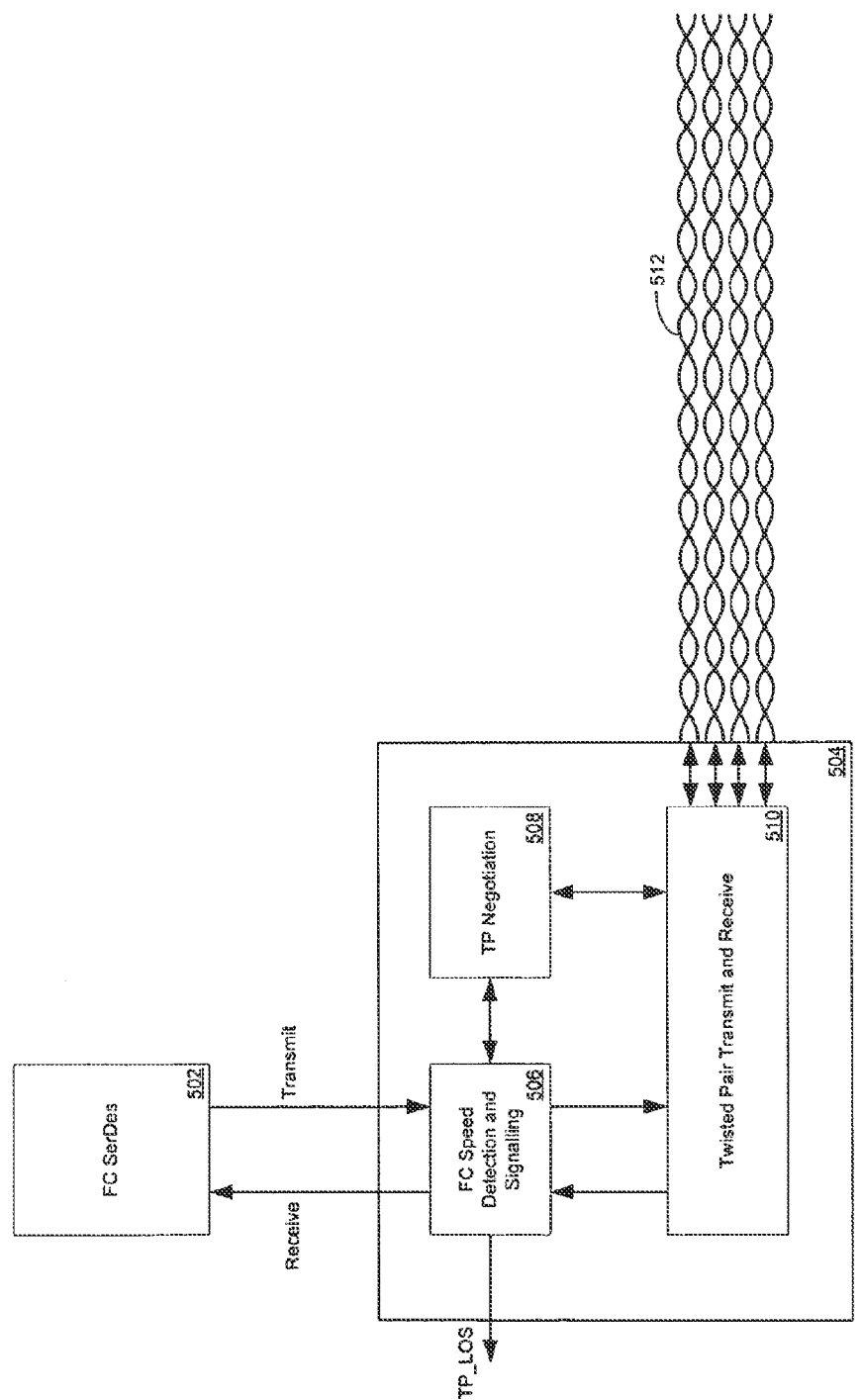
FIG. 5 is a block diagram illustrating speed negotiation for twisted pair links in fibre channel systems, in accordance with an embodiment of the invention.

FIG. 5 is a block diagram illustrating speed negotiation for twisted pair links in fibre channel systems, in accordance with an embodiment of the invention. Referring to FIG. 5, there is shown a fibre channel SerDes 502, a fibre channel (FC) twisted pair PHY block 504, and a twisted pair cable 512. The FC twisted pair PHY block 504 comprises a FC speed detection and signaling block 506, a twisted pair (TP) negotiation block 508, and a TP transmit and receive block 510.

The FC SerDes 502 may comprise suitable logic, circuitry and/or code that may enable conversion of a parallel data stream from FC-2 to a serial data stream and vice versa. The fibre channel (FC) twisted pair PHY block 504 may comprise suitable logic, circuitry and/or code that may enable interfacing directly to the FC SerDes 502. The fibre channel (FC) twisted pair PHY block 504 may be able to operate at a variety of speeds, for example, 1 Gbps, 2 Gbps 4 Gbps, 8 Gbps, or 10 Gbps. The fibre channel (FC) twisted pair PHY block 504 may be able to negotiate to a common speed on the twisted pair cable 512 and operate with existing FC-2 layer solutions.

The FC speed detection and signaling block 506 may comprise suitable logic, circuitry and/or code that may enable detecting the rate at which data is being transmitted and received by the FC SerDes 502. The TP negotiation block 508 may comprise suitable logic, circuitry and/or code that may enable storage of the values of available speeds of data transmission from the FC SerDes 502 through the FC speed detection and signaling block 506. The TP transmit and receive block 510 may comprise suitable logic, circuitry and/or code that may enable receiving and transmitting data between remote hosts via the TP cable 512.

There is a data path between the host A 402 and the SerDes A 406 and between the host B 410 and the SerDes B 414. There may be a lower speed management control path, management data input/output (MDIO) to monitor and control the fibre channel twisted pair PHY layers 408 and 416, for example, between the host A 402 and the SerDes A 406 and between the host B 410 and the SerDes B 414.

In an embodiment of the invention, the FC twisted pair PHY block 504 may mimic the behavior of a fibre optic transceiver module as it interfaces with the FC-0 SerDes 502, while leveraging the basic mechanisms of the IEEE 802.3 auto-negotiation mechanism on the twisted pair 504 interface. The electrical interface between the FC TP PHY block 504 is identical to the existing FC-physical interface (PI)2 standard interface between a FC SerDes 502 and a FC fibre optic transceiver module. After power-up, or other initialization, the FC TP PHY block 504 may enable transmission of FC IDLE signals back to the FC SerDes 502 at the highest available rate. FC TP SerDes monitors and determines maximum host speed per FC-FS rules. Alternatively, the host may transmit its capabilities to the FC TP PHY through low speed management or configuration pins.

After the host speeds are determined, the TP negotiation block 508 may enable the TP transmit and receive block 510 to initiate negotiation on the TP cable 512. The TP transmit and receive block 510 may start negotiation on the TP cable 512 based on the IEEE 802.3 auto-negotiation mechanism. The TP negotiation block 508 may receive a negotiation signal from its remote link partner, complete negotiation and establish a link at the negotiated speed and set the TP_LOS signal to LOW. The TP negotiation block 508 may inform the FC speed detection and signaling block 506 regarding the negotiated speed of data transfer. The FC TP PHY 504 may then signal the FC SerDes 502 regarding the negotiated speed of data transfer. The FC SerDes 502 may then begin transmitting data packets at the negotiated speed on to the TP cable 512 via the FC TP PHY 504 establishing a two-way communication.

In another embodiment of the invention, the electrical interface between the FC TP PHY may be identical to the existing FC-PI2 standard interface between a FC SerDes 502 and a FC fibre optic transceiver module. The FC TP PHY 504 at node A and/or at node B after power up may transmit a FC IDLE signal to their host at their highest available baud rate. The FC TP PHY 504 at node A and/or at node B may set their TP_LOS HIGH indicating an untrained or open link while transmitting an IDLE signal back to their host. The FC TP PHY 504 at node A and/or at node B may start an auto-negotiation process over the twisted pair cable 512 with its corresponding remote link partner per IEEE 802.3 Auto-Negotiation mechanism, FC TP PHY at node A and/or at node B, using a low speed negotiation protocol not depending on end-to-end timing synchronization. The two FC TP PHYs may complete their speed negotiation, for example, as using fast link pulses and arrive at a common speed for communication between the two FC TP PHYs. The FC TP PHYs may then establish a common speed and write the common speed in to a TP link speed register.

Two new order sets called IDLE2 and IDLE3 may be introduced for transmission over TP link. After local and remote TP-PHYs are trained per IEEE 802.3 AN, each FC TP PHY 504 may transmit across the TP link IDLE2. IDLE2 and IDLE3 are two order sets created for transmission over TP-link to determine link quality and are removed by the remote TP-PHYs. IDLE2 and IDLE3 order set structure may be 4 bytes long, for example, and starts with K28.5, followed by three bytes, for example, not in use in FC structure currently so it may be distinguished by the remote TP-PHY. Reserve order set IDLE2 and IDLE3 may allow the TP-PHY to be in lock, operational meeting minimum BER, and ready to pass host traffic when TP-PHYs are trained and TP-SerDes have determined host speed.

Prior to opening TP-link communication channel to the host traffic, each TP-PHYs transmit IDLE2 for a specified duration for the purpose of determining link bit error rate (BER). Link BER is verified by the remote TP-PHY while monitoring IDLE2 order set. When the required BER is achieved, then the remote TP-PHY may transmit back to TP-PHY IDLE3, acknowledging that the BER goal is met. Similarly, local TP-PHY may transmit IDLE3 to the remote TP-PHY, if the BER goal is met. If the desired link BER is not met by one or both link partners, then the remote TP-PHY may remove current link speed from its capability. The remote TP-PHY may then restart 802.3 AN. This process may continue to lowest speed in order to meet BER target. If no link speed meets the link BER objective, then the TP-PHY may output a fault signal to the host.

When the two FC TP PHYs 408 and 416 successfully negotiate to a common speed, then they mutually establish a link at that speed, and begin transmitting FC IDLE3 signals across TP link. FC IDLE3 has similar structure to FC IDLE2, for example, starting with K28.5 with 3 additional bytes. FC IDLE3 may not be transmitted over the FC physical interface (PI) SerDes interface. When the remote TP-PHY receives FC IDLE3, then the link may be ready for host traffic at a fixed speed meeting the host and TP-PHY requirements. FC TP PHYs 408 and 416 may set their RX LOS deasserted signaling host A 402 and host B 410 to start transmission. FC TP PHYs may also transmit FC IDLE to the host. The FC TP PHY 504 may simultaneously synchronize clocks, and adjust phase lock loops and other timing elements required to transfer data at the negotiated speed. The host A 402 and host B 410 may read a TP link speed register and start transmitting at the TP link rate. Alternatively, host A 402 and host B 410 may start cycling through their available rates, and when the host rate matches the TP common rate, the data may flow through the FC TP PHY 504. If there is no common speed, then negotiation does not conclude successfully, and both FC TP PHYs 408 and 416 may continue to monitor their respective FC SerDes 502 signals for any additional available speeds.

Figure 6:
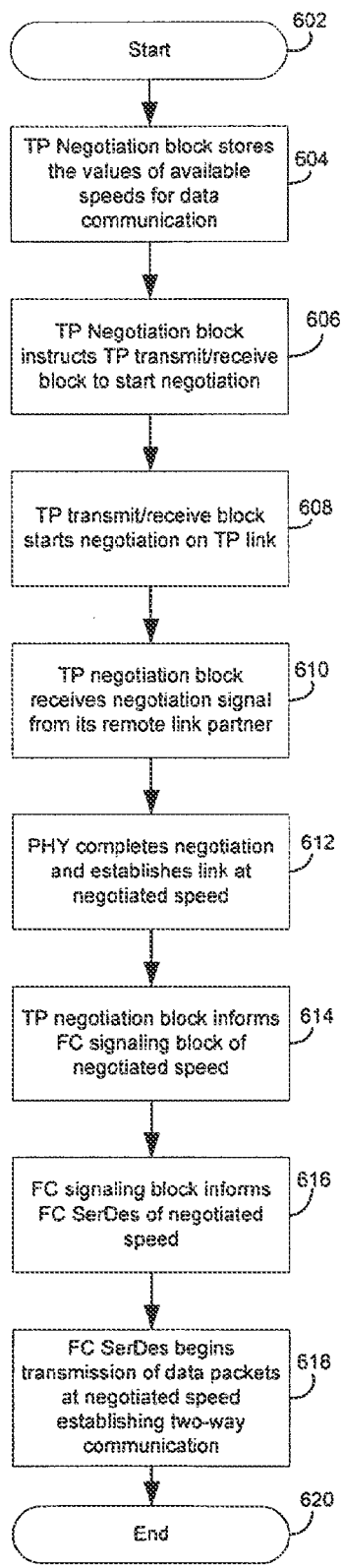
FIG. 6 is a flow chart illustrating exemplary steps for speed negotiation for twisted pair links in fibre channel systems, in accordance with an embodiment of the invention.

FIG. 6 is a flow chart illustrating exemplary steps for speed negotiation for twisted pair links in fibre channel systems, in accordance with an embodiment of the invention. Referring to FIG. 6, exemplary steps may begin at step 602. In step 604, the TP negotiation block 508 may store the values of available speeds of data transmission from the FC SerDes 502 through the FC speed detection and signaling block 506 in a TP link speed register. In step 606, the TP negotiation block 508 may be enabled to instruct the TP transmit and receive block 510 to initiate negotiation on the TP cable 512. In step 608, the TP transmit and receive block 510 may start negotiation on the TP cable 512 based on the IEEE 802.3 auto-negotiation mechanism. In step 610, the TP negotiation block 508 may receive a negotiation signal from its remote link partner. In step 612, the FC TP PHY 504 may complete negotiation and establish a link at the negotiated speed and set the TP_LOS signal to LOW. In step 614, the TP negotiation block 508 may inform the FC speed detection and signaling block 506 regarding the negotiated speed of data communication. In step 616, the FC TP PHY 504 may then signal the FC SerDes 502 regarding the negotiated speed of data communication. In step 618, the FC SerDes 502 may then begin transmitting data packets at the negotiated speed on to the TP cable 512 via the FC TP PHY 504 establishing a two-way communication. Control then passes to end step 620.

In an embodiment of the invention, a method and system for communicating data between fibre channel host devices, for example, host A 402 and host B 410 via a twisted pair link 418 based on a common speed negotiated between the fibre channel host devices, host A 402 and host B 410. At least one available speed may be determined for the communication of data between the fibre channel host devices, host A 402 and host B 410 over the twisted pair link 418. The determined available speeds for the communication of data between the fibre channel host devices, host A 402 and host B 410 over the twisted pair link 418 may be stored in a TP link speed register in the TP negotiation block 508. The determined available speeds for each of the fibre channel host devices, host A 402 and host B 410 may be exchanged via at least one fast link pulse signal. The negotiated common speed may be communicated to each of the fibre channel host devices, host A 402 and host B 410 after the common speed is negotiated between the fibre channel host devices, host A 402 and host B 410. The common speed negotiated may be a highest available speed for the communication of data between the fibre channel host devices, host A 402 and host B 410.

Another embodiment of the invention may provide a machine-readable storage, having stored thereon, a computer program having at least one code section executable by a machine, thereby causing the machine to perform the steps as described above for speed negotiation for twisted pair links in fibre channel systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communication system, comprising:
providing speeds available to a first fiber channel host device for communication of data with a second fiber channel host device via a twisted pair link;
receiving speeds available to a second fiber channel host device for communication of data with the first fiber channel host device via the twisted pair (TP) link;
negotiating a common speed for communication of data between the first and second fiber channel host devices over the TP link based upon the speeds available to the first and second fiber channel host devices;
setting a TP LOS signal to HIGH, wherein the TP LOS signal set to HIGH indicates an untrained or open link;
communicating one or more IDLE signals between the first and second fiber channel host devices based on the common speed to determine a link bit error rate of the TP link and to verify the bit error rate; and
initiating communication of data between the first and second fiber channel host devices responsive to the verification of the link bit error rate.

2. The method of claim 1, further comprising determining the speeds available to the first fiber channel host device for communication of data via the twisted pair link.

3. The method of claim 1, wherein the speeds available to the first fiber channel host device for communication of data via the twisted pair link are provided to the second fiber channel host device via at least one fast link pulse signal.

4. The method of claim 3, wherein the speeds available to the first fiber channel host device for communication of data via the twisted pair link are determined by a medium access control (MAC) layer.

5. The method of claim 4, wherein the MAC layer polls a physical (PHY) layer through a lower speed management control path to determine the speeds available to the first fiber channel host device for communication of data via the twisted pair link.

6. The method of claim 4, further comprising communicating the common speed to the MAC layer after negotiating the common speed.

7. The method of claim 1, wherein the speeds available to the second fiber channel host device for communication of data via the twisted pair link are received from the second fiber channel host device via at least one fast link pulse signal.

8. The method of claim 1, wherein the common speed is a highest common speed of the speeds available to the first and second fiber channel host devices.

9. The method of claim 1, wherein if the link bit error rate at the common speed is not acceptable for communication of data between the first and second fiber channel host devices, negotiating a next available speed of the speeds available to the first and second fiber channel host devices as a new common speed.

10. A fiber channel host device, comprising: processing circuitry operable to provide speeds available to the fiber channel host device for communication of data with another fiber channel host device via a twisted pair link;
the processing circuitry further operable to negotiate a common speed for communication of data between the fiber channel host device and the other fiber channel host device over the twisted pair link, the negotiated common speed based upon the speeds available to the fiber channel host device and speeds available to an other fiber channel host device for communication of data via the twisted pair link;
the processing circuitry further operable to setting a TP LOS signal to HIGH, wherein the TP LOS signal set to HIGH indicates an untrained or open link;
the processing circuitry further operable to communicate one or more IDLE signals between the fiber channel host device and the other fiber channel host device over the twisted pair link based on the negotiated common speed to determine a link bit error rate of the twisted pair link and to verify the link bit error rate;
and the processing circuitry further operable to initiate communication of data between the fiber channel host device and the other fiber channel host device responsive to the verification of the link bit error rate.

11. The fiber channel host device of claim 10, wherein the processing circuitry is operable to receive the speeds available to the other fiber channel host device for communication of data via the twisted pair link.

12. The fiber channel host device of claim 10, wherein the processing circuitry is operable to determine the speeds available to the fiber channel host device for communication of data via the twisted pair link.

13. The fiber channel host device of claim 10, wherein the speeds available to the fiber channel host device for communication of data via the twisted pair link are provided to the other fiber channel host device via at least one fast link pulse signal.

14. The fiber channel host device of claim 10, wherein the speeds available to the other fiber channel host device for communication of data via the twisted pair link are received from the other fiber channel host device via at least one fast link pulse signal.

15. The fiber channel host device of claim 10, wherein the processing circuitry transmits an IDLE signal to the other fiber channel host device at an initial common speed to determine the negotiated common speed.

16. The fiber channel host device of claim 15, wherein if the processing circuitry does not receive an IDLE signal from the other fiber channel host device at the initial common speed within a predefined time period after transmission of the IDLE signal to the other fiber channel host device, a second IDLE signal is transmitted to the other fiber channel host device at a next lower speed available to the fiber channel host device and the other fiber channel host device for communication of data via the twisted pair link.

17. The fiber channel host device of claim 10, wherein if the link bit error rate at the common speed is not acceptable for communication of data between the fiber channel host device and the other fiber channel host device, negotiating a next available speed of the speeds available to the fiber channel host device and the other fiber channel host device as a new common speed.

18. A network interface controller (NIC), comprising:
a medium access control (MAC) layer operable to determine speeds available for communication of data with another NIC via a twisted pair link;
a physical (PHY) layer operable to:
transmit the speeds available for communication of data via the twisted pair link to the other NIC;
receive speeds available to the other NIC for communication of data via the twisted pair link;
negotiate a common speed for communication of data between the NIC and the other NIC based upon the speeds available to the NIC and the other NIC for communication of data via the twisted pair link;
setting a TP LOS signal to HIGH, wherein the TP LOS signal set to HIGH indicates an untrained or open link;
and communicating one or more IDLE signals between the NIC and the other NIC based on the common speed to verify a link bit error rate;
establish a link to communicate the data between the fiber channel host devices on said twisted pair link at the negotiated common speed;
setting a TP LOS signal to Low, wherein said TP LOS signal set to Low indicates establishment of a negotiated link;
and the MAC layer further operable to initiate communication of data between the NIC and the other NIC responsive to the verification of the link bit error rate.

19. The NIC of claim 18, wherein the MAC layer is operable to poll the PHY layer through a lower speed management control path to determine the speeds available for communication of data via the twisted pair link.

20. The NIC of claim 18, wherein the PHY layer is operable to establish the twisted pair link between the NIC and the other NIC.

* * * * *